April 22, 1969 G. WALTER 3,439,918

NARROW TRACK MAGNETIC RECORDING

Filed June 10, 1966

*INVENTOR.*
GERHARD WALTER

BY [signature]

ATTORNEY 3,439,918

NARROW TRACK MAGNETIC RECORDING

Gerhard Walter, Hughsonville, N.Y., assignor to International Business Machines Corporation, Armonk, N.Y., a corporation of New York Filed June 10, 1966, Ser. No. 556,699
Int. Cl. G11b 5/58
U.S. Cl. 274—4 11 Claims

ABSTRACT OF THE DISCLOSURE

A magnetic recording system for making very narrow magnetic records on a magnetic tape, including a non-magnetic transfer drum having a very narrow magnetizable track located on the surface thereof, a magnetic recording head in intimate contact with said magnetizable track, rotating the drum while passing the tape in surface to surface contact with said drum at a point remote from said recording head, and a bias coil for affecting magnetic transfer of the information recorded on said transfer drum to the magnetic tape.

Figures 1, 2, 3, 4:
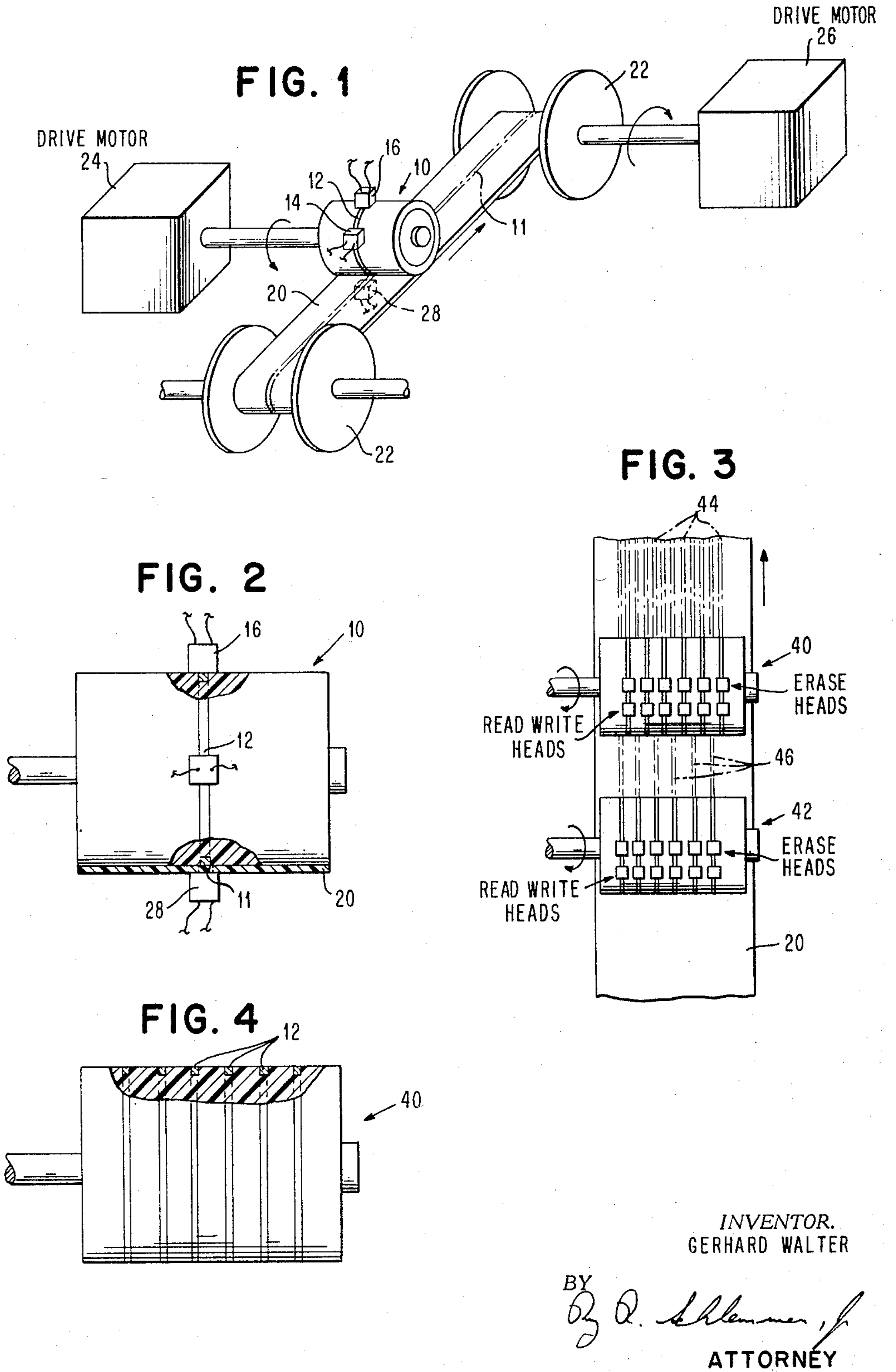

The present invention relates to magnetic recording. More particularly it relates to a method and apparatus whereby extremely narrow magnetic data tracks may be conveniently recorded on and read from a magnetic surface.

In both the communications and entertainment arts as well as the data processing art, magnetic recording is an extremely important tool in that it permits the storage of information on a suitable magnetic surface such as a tape or a drum which record may be kept and reaccessed indefinitely. In the data proessing arts it is extremely important that the greatest possible packing factor or density of information per unit of surface area on the recording surface be obtained. The importance of this can best be appreciated when data for conventional digital data processing systems is to be recorded in the form of binary bits and for even the most rudimentary data handling systems many millions of bits must be manipulated.

While perhaps the cheapest method of storage utilized in conventional electronic computers, magnetic tape recording systems are also the slowest wherein the actual traversal or scanning of the magnetic tape by suitable recording and pickup means is a very time-consuming operation. Thus if the maximum possible quantity of data is placed on the recording surface in a given area it will be appreciated that a smaller amount of time will be necessary to physically scan a given amount of data. Further, the more data that can be stored in a finite surface area of the recording tape the less will be the total investment in tape to obtain a given quantity of storage. In the larger scale systems of today, even though the tape is relatively cheap, where several thousand tape reels may be required to store all of the data for a given problem a factor of 2 in packing density would obviously provide a considerable saving in tape hardware.

In some current systems wherein a plurality of tracks are utilized across a relatively wide tape each track is utilized to store a single bit of a particular data word or character. Thus if seven bits make up the character seven tracks would be utilized wherein all seven tracks are scanned concurrently, i.e. transversely to pick up the seven bits that would be recorded thereon representative of said character. Such a system is known as a serial by character parallel by bit record. It is apparent if it were designed to have larger characters more tracks would of necessity have to be used. However with the current recording systems great difficulty is experienced in restricting the magnetic signal produced by a magnetic read-write head to the immediate area adjacent the air gap of said head. This is due to inherent fringing fields etc. which tend to radiate from the air gap and thus record a signal which is considerably wider than the gap within the head. Hundreds of different magnetic head structures have been designed and utilized in the past in an effort to minimize the stray fields which inherently are produced by a recording head and which tend to reduce or limit the narrowness of the resultant recorded track on the magnetic tape. As is apparent, the development of very specialized head structures for achieving such narrow track recording is very expensive and although track densities of up to one hundred per inch have been obtained the structures required for achieving such densities have been extremely expensive to manufacture.

It has now been found that an extremely narrow magnetic record track may be recorded upon a magnetic tape, drum, or other suitable recording surface utilizing a modified transfer technique. By a further extension of this technique it has been found that an extremely high packing density or number of tracks may be recorded on a given width of recording surface.

It is accordingly the primary object of the present invention to provide an improved magnetic recording technique.

It is a further object to provide such a technique and apparatus wherein extremely narrow tacks are realizable.

It is a further object to provide such an apparatus and method utilizing a magnetic transfer recording technique wherein the width of the recorded track is determined by the width of the magnetizable surface on the transfer member.

It is still another object of the system to utilize a plurality of individual magnetizable tracks on a non-magnetic transfer member to attain multitrack recording.

The foregoing and other objects, features and advantages of the invention will be apparent from the following more particular description of preferred embodiments of the invention, as illustrated in the accompanying drawings.

In the drawings:

FIGURE 1 is a perspective view of a greatly simplified magnetic recording system embodying the principles of the present invention, FIGURE 2 is an elevational view partly in cross-section of the transfer membrane 10 of FIGURE 1 illustrating an important principle of the present invention, FIGURE 3 is a top view of an embodiment of the present invention especially adapted for multitrack recording, and FIGURE 4 is an elevational view partly in cross-section similar to FIGURE 2 of one of the transfer members 40 of FIGURE 3.

The objects of the present invention are accomplished in general by a magnetic recording system including a non-magnetic transfer member having a narrow magnetizable track on the surface thereof, magnetic recording head means located to be in intimate contact with said movable transfer member, means for passing a magnetizable surface in intimate surface to surface contact with said transfer member at a point remote from said recording head and means for effecting magnetic transfer of the information recorded on said transfer member to the magnetizable surface.

In a preferred embodiment of the invention the transfer member comprises a rotary drum constructed of a non-magnetic material such as a suitable plastic having a very thin magnetic transfer strip located on the outer surface thereof. The recording head is located at one point about the periphery of said drum and a magnetic tape is passed in intimate contact with said drum at a point substantially removed from said recording head at which point the information recorded on the thin wire imbedded in the drum is transferred to the tape. Multitrack recording may readily be achieved by utilizing a plurality of such magnetic wires or transfer strips imbedded in a single transfer drum and with this arrangement much less expensive recording heads may be utilized to achieve a given track density on the tape. To achieve still greater track density a scheme is presented whereby a plurality of multitrack transfer members may be utilized wherein the ultimate recording tracks on the magnetic tape will be alternated between said plurality of transfer members. While the system is believed to have the greatest utility for magnetic tape recording, it would also have utility for recording on magnetic drums and the like where very narrow tracks are desired.

Transfer recording or the recording on a copy tape from a master tape or master recording head using a magnetic transfer member is known in the art however it has primarily been utilized for the purpose of making copies of a master tape or signal source. Such a system is disclosed and described in U.S. Patent No. 2,890,288 of J. J. Newman. In such prior art systems a master record is placed on the magnetizable surface of a transfer drum and the signal is then transferred to one or more recording tapes remotely positioned from the master recording source. It should be noted that in such systems the magnetizable surface on the drum is normally as wide or wider than the width of the tape upon which the signal is to be recorded and is in no way determinative of the ultimate width of the recorded information on the copy tape. It is known that by passing the copy tape in sufficiently intimate contact with the transfer means some transfer of information will occur with no external means applied whatsoever, however as in the above referenced patent by applying a suitable magnetic bias as by an induction coil a greatly improved transfer of information from the transfer surface to the copy tape will ensue.

The present invention utilizes the concept of transfer recording, however according to the present invention it has been discovered that the width of the record transferred to the copy tape very closely duplicates that of the width of the originally recorded track. Thus extending this principle the recording surface or transfer strip was made extremely narrow as by imbedding a very fine iron wire in the surface of a plastic drum and utilizing an inexpensive, essentially wide track head at a remote recording station the transfer strip was magnetically recorded and an extremely narrow track substantially the same width as that of the wire itself was obtained on the copy tape.

Referring now to the drawings. In FIGURE 1 a perspective of a very simplified version of the present invention is shown. The heart of the device is the transfer drum 10 constructed of a non-magnetic material having the magnetic track or transfer strip 12 imbedded in the surface thereof. The system includes a read-write head 14 and an erase head 16. The magnetic tape 20 is shown passing between two drums 22. Drive motors 24 and 26 are provided for the transfer drum and the takeup reel respectively. The drive motor 24 driving the drum would be the primary speed determining the drive for the system. The motor 26 is provided with suitable driving and tape tensioning arrangements and is a type well known in the art.

As stated previously the drive motor 24 illustrated as driving the transfer drum 10 is the primary speed controlling member of the system and as is well known in the art the speed of the tape at the recording station is the critical speed and must be maintained uniform. Only the connection between the drive motor 24 and the drum is illustrated in the drawing however it will be appreciated that suitable drive sprockets would also be provided from the motor for driving the tape at the same speed as the periphery of the drum.

The recorded magnetic track is indicated in FIGURE 1 by the reference numeral 11. A bias coil 28 is shown on the opposite side of the tape from the drum. This coil is provided for the purpose of imposing a magnetic bias field between the transfer strip 12 and the tape 20 at that location where the tape engages the surface of the drum 10. Thus the coil 28 assists in effecting the maximum inductive transfer of signal information from the drum to the tape. The coil 28 is supplied from a suitable source of alternating current.

The overall operation of the device is apparent in that information to be recorded is brought into the head 14 which suitably records same on the transfer strip 12 on the surface of the transfer drum 10 and then as the transfer drum 10 is rotated into contact with the tape 20, the magnetic information on the magnetic track 12 is transferred to the tape as illustrated by the track 11. As the drum rotates further the erase head 16 which may be continually energized removes or erases the recorded information from the track 12 as it passes the erase station.

FIGURE 2 is an enlarged view of the simple single track transfer drum shown in FIGURE 1. In this figure the same reference numerals are used as in FIGURE 1 for clarity. In the embodiment illustrated in FIGURE 2 the main body of the drum 10 is indicated as being made of a suitable non-magnetic material such as plastic although a non-magnetic metal could equally well be used. The transfer strip 12 is also clearly shown imbedded in the surface of the drum 10. The tape 20 is shown at the bottom of the figure in intimate contact with the drum and the magnetic track 11 is shown as being substantially the same width as the ring 12. It may thus be seen that a very narrow record track 11 may be obtained by making the transfer strip 12 as narrow as desired. Rings and thus record tracks as narrow as a fraction of a mil can be obtained by this method.

Two possible extensions of the present invention are illustrated in FIGURE 3. The first is the use of a single multiple track drum 40 wherein a plurality of closely spaced tracks 12 may be recorded on a suitable magnetic tape utilizing a drum having a plurality of the individual transfer strips 12 imbedded in the surface thereof. This allows the use of relatively inexpensive recording heads wherein shielding is not necessary between the heads to prevent unwanted cross recording or cross modulation being transferred between tracks. However the actual transfer between the drum 40 and the tape 20 into discrete separate tracks presents no problem.

It will further be noted that where extremely tight packing is required, the desired track density may require transfer strips so closely spaced on a single drum that shielding between the heads could become a major problem, approaching that of a conventional multihead structure. To solve this problem FIGURE 3 shows a second drum 42 which may be provided and the drums so located that each drum records alternate tracks, i.e. the drum 40 records and reads the tracks 44 and the drum 42 reads and records the tracks 46. If it were desired to read data out of the alternate tracks in time coincidence from all 12 of the tracks indicated in the figure a delay could be inserted in the direction of motion of one of the drums so that the information would be in time coincidence with that pickup by the other drum with a given direction of the movement.

It will further be appreciated that the concept of FIGURE 3 could be extended so that three or even more individual drums could be utilized to increase the track density even further while maintaining the magnetic read-write head geometries as simple as possible, i.e. the minimum inter-head shielding required. It will be obvious of course that some spacing must be maintained between the individual tracks so that at some point a practical density limit will be reached. Actual recorded tracks as narrow as a fraction of a mil and track densities as high as one hundred per inch can be achieved by the present system at a considerable saving in cost over complicated and expensive multihead read-write structures presently known in the art.

An alternative to providing a plurality of transfer members or drums as illustrated in FIGURE 3 to achieve higher track densities is to stagger the read-write heads on the drum surface or to provide alternate staggered rows of heads to avoid unwanted magnetic linking between the heads, however such alternatives would be obvious to persons skilled in the art.

FIGURE 4 is a cross-section of one of the drums 40 or 42 similar to FIGURE 2 illustrating a plurality of magnetic transfer strips 12 imbedded in the non-magnetic surface of drum 40.

While the previous description of the various embodiments of the system have been directed primarily towards the problems of recording narrow tracks on a magnetic tape or the like it should be understood that the present concepts apply equally well for the picking up or reading of information from the magnetic tape. In this latter case the system and apparatus look the same however a transfer strip having a different coercivity should be used to achieve optimal pickup. Assuming that a different transfer member and transfer strip is used, the magnetic record is transferred to the track 12 by means of transfer pickup which effect is enhanced by another inductive biasing coil 28 as disclosed in FIGURE 1. The information is then passed to the read-write head 14 where it is picked up and utilized for whatever purpose may be desired and subsequently erased by the erase head 16 at which point the erased transfer strip is again passed in contact with a new section of the tape passing thereunder. It will, of course, be noted that with reading the pickup head must precede the erase head.

There has thus been disclosed and described a novel recording system for making very narrow track magnetic recordings on the surface of a magnetic tape, drum or similar recording surface. By means of the novel recording concept set forth herein utilizing the narrow magnetic transfer member imbedded in the surface of a non-magnetic roller or other similar carrier, very narrow record tracks may be obtained at a cost figure far below that utilizing specialized recording head structures. The invention when extended is particularly suitable for making a large number of very narrow closely spaced tracks in parallel along the length of a recording tape.

While the invention has been disclosed and described with respect to the illustrated and described embodiments it is understood that a number of changes and modifications in the basic structure of the system might easily be made by a person skilled in the art without departing from the spirit and scope of the invention. For example although the system has its major utility in the making of magnetic records on magnetic tape it is apparent that the principles of the invention could be utilized for placing information on a magnetic storage drum. Similarly although the transfer member has been disclosed as a drum or cylinder made of an essentially rigid material it is apparent that a flexible member of similar shape such as a non-metallic tape loop having a very thin magnetic recording track on the surface thereof might be utilized in place of the rigid drums disclosed. As stated previously with reference to FIGURE 3, although two drums, each for recording alternate tracks on the tape, are illustrated, it is apparent that more than two drums could be used if it is found that the desired track spacing is such that it would be difficult to locate the read-write heads on just two drums and still be able to obtain the advantage of inexpensive heads. Alternatively staggered means of heads could be used on a single drum.

While the invention has been particularly shown and described with reference to preferred embodiments thereof, it will be understood by those skilled in the art that the foregoing and other changes in form and details may be made without departing from the spirit and scope of the invention.

What is claimed is:

1. A transfer member for the transfer recording of a very narrow magnetic track upon a magnetic recording surface said transfer member having its outer surface, adapted to contact said recording surface, constructed of a non-magnetic material with at least one very narrow strip of magnetic material constituting a transfer strip located on the surface of said transfer member and adapted to contact said magnetic recording surface, said strip being surrounded on both sides by a non-magnetic surface.

2. A transfer member as set forth in claim 1 wherein said transfer member is a rigid cylinder and the magnetic transfer strip lies in a plane perpendicular to the axis of said cylinder and said magnetic recording surface is flexible.

3. A transfer member as set forth in claim 2 wherein said transfer member has a plurality of substantially equally spaced narrow magnetic transfer strips embedded in the surface of said transfer member wherein each of said strips lies within a different one of a plurality of planes perpendicular to the axis of said cylindrical transfer member, and each said strip is separated by a band of non-magnetic material.

4. A magnetic recording system for recording at least one very narrow magnetic track on a magnetizable surface said system comprising:

a movable magnetic recording surface, a transfer member having a non-magnetic surface adapted to move in surface to surface contact with at least one area of said magnetic recording surface, a very narrow magnetic transfer strip on the surface of said transfer member having said non-magnetic material at each side thereof, read-write head means located adjacent said transfer strip at a point displaced from the area of contact between the magnetic transfer member and the magnetic recording surface and adapted to write information on and read information from said transfer strip, erase head means located adjacent to said magnetic transfer strip between said read-write head and said area of contact between the transfer member and the magnetic recording surface, means to move said transfer member and said magnetic recording surface at the same speed at the area of contact therebetween.

5. A magnetic recording system as set forth in claim 4 wherein said transfer member comprises a rotatable cylinder the outer surface of which is constructed of a non-magnetic material.

6. A magnetic recording system as set forth in claim 5 wherein said magnetic transfer strip comprises a very narrow magnetic wire imbedded in the surface of said transfer cylinder said wire lying in a plane perpendicular to the axis of said cylinder.

7. A magnetic recording system as set forth in claim 6 wherein the magnetic recording surface comprises a magnetic tape.

8. A magnetic recording system as set forth in claim 7 including bias means for providing a magnetic bias field between the magnetic transfer strip and the magnetic recording surface at their area of contact to improve the transfer of magnetic information therebetween.

9. A magnetic recording system for recording M very narrow magnetic record tracks upon a movable magnetic recording surface said system comprising a movable magnetic recording surface for receiving information to be recorded thereon and means for moving same, N cylindrical transfer members having non-magnetic exterior surfaces each of same being adapted to move in surface to surface contact with said magnetic recording surface and at the same speed as said magnetic recording surface, M/N very narrow magnetic transfer strips on the surface of each of said transfer members said strips on each said transfer member being substantially equally spaced and each lying in a separate one of a plurality of planes perpendicular to the axis of each said transfer member each said strip being separated from adjacent strips by a band of non-magnetic material, M/N read-write heads located adjacent each said transfer member one head being located adjacent each transfer strip on the surface of said transfer member, said heads being located at a point displaced from the area of contact between the movable magnetic recording surface and the transfer member, erase means associated with each said transfer member for selectively erasing information stored on said magnetic transfer strips, and means for moving said transfer members and said magnetic recording surface in surface to surface contact at the same relative speeds, said magnetic transfer members and the magnetic recording strips located thereon being so arranged and spaced relative to one another that any one of a group of N adjacent record tracks appearing on the magnetic recording surface will be produced by transfer recording from a transfer strip on a different transfer member.

10. A magnetic recording system as set forth in claim 9 including an inductive bias means at the area of contact between each transfer member and the magnetic recording surface to improve the magnetic transfer of information therebetween.

11. A magnetic recording system as set forth in claim 9 wherein the movable magnetic recording surface comprises a magnetic tape.

References Cited

UNITED STATES PATENTS 3,277,244 10/1966 Frost.
2,768,049 10/1956 Geiser.

LEONARD FORMAN, *Primary Examiner.*

R. A. FIELDS, *Assistant Examiner.*

U.S. Cl. X.R.

179—100.2